W. McCALL, M. O'SULLIVAN & E. C. McCALL.
PUNCTURE PROOF SPRING TIRE.
APPLICATION FILED APR. 12, 1916.

1,217,124.

Patented Feb. 20, 1917.

WITNESSES:
Charles Rehles
Thos Eastberg

Inventors.
William McCall
Michael O'Sullivan
Elvin C. McCall
BY Strong & Townsend
ATTORNEYS

UNITED STATES PATENT OFFICE.

WILLIAM McCALL, MICHAEL O'SULLIVAN, AND ELVIN C. McCALL, OF SAN FRANCISCO, CALIFORNIA.

PUNCTURE-PROOF SPRING-TIRE.

1,217,124.   Specification of Letters Patent.   Patented Feb. 20, 1917.

Application filed April 12, 1916. Serial No. 90,606.

*To all whom it may concern:*

Be it known that we, WILLIAM MCCALL, MICHAEL O'SULLIVAN, and ELVIN C. MCCALL, citizens of the United States, residing in the city and county of San Francisco and State of California, have invented new and useful Improvements in Puncture-Proof Spring-Tires, of which the following is a specification.

Our invention relates to improvements in vehicle tires, and especially to automobile tires, which improvement is designed to make the tire substantially puncture-proof and resilient, without the aid of compressed air and without the employment of an inner air-containing tube.

It consists of an interwoven and interlaced series of steel bands adapted to fit the interior of the outer casing of a tire, and having sufficient resiliency to maintain the parts in a substantially circular or vertically elliptical position, and means for securing such a casing within the outer tire and to the rim.

It also comprises details of construction which will be more fully explained by reference to the accompanying drawings, in which—

As exemplified in the following description and illustrated in the accompanying drawings, A is an outer casing having any usual or suitable characteristics of such casings and adapted to be secured to the rim B of the wheel. Within this casing is fitted a structure made of smooth tempered steel bands interwoven so that the warp and woof of the structure stand at approximately right angles to each other, one set of bands encircling the wheel and the other set extending transversely thereof. These bands are indicated at 2 and 3 and may be woven into a body for assuming a form approximately circular, or it may be made elliptical in form with the greatest depth radial to the wheel. These bands are woven together so as to form a complete tube which will fit within the outer casing.

Figure 1:
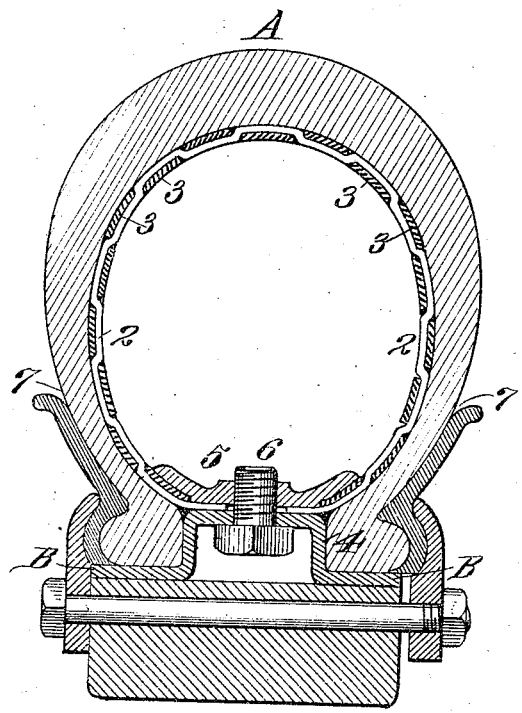
Figure 1 is a cross section of the tire, showing the application of the device.
Figure 2:
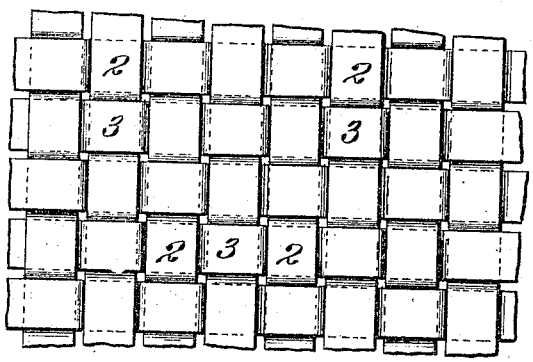
Fig. 2 is a detail view of the woven fabric.

In order to secure these bands to the wheel, we have shown the rim formed with a raised ledge or table 4, extending around the rim and serving as a rest for the inner periphery of the elastic tube. Bent plates 5 are fitted to rest upon the inner ends of the transversely extending bands which are bent to fit this position, as shown in Fig. 1 and bolts 6 are screw-threaded to fit corresponding threads in the centers of the plates 5. The plates 5 have depressed edge seats which engage over the outer of the longitudinal bands 3 as shown in Fig. 1. The heads of the bolts lie beneath the center of the elevated table and by screwing the bolts into the plates the inner ends of the transverse bands will be firmly locked to the table and retain the elastic metal tube in the proper position.

The edges of the outer tire or casing may be secured to the rim, as shown in Fig. 1, or any other suitable manner, thus inclosing the metal tube. The elasticity of these spring strips and their stiffness will be so designed, that tires made in this manner will be sufficiently resilient to bear the load which is designed to be carried upon the wheels, and they thus form an enduring spring structure without the aid of any air-containing inner tube.

The breadth of the strips or bands forming this tube is sufficient so that when woven together they form a complete armor or jacket through which ordinary puncturing devices cannot pass. The outer casing serves to hermetically seal the interior and prevent dust and dirt from reaching the elastic interior portion.

The rings which serve to hold the edges of the outer casing to the rim are extended outside the walls of the casing, as at 7, so as to present resistant surfaces against which the sides of the casing bear, and by which the casing is supported against transverse spreading when the load or vibration compresses the inner spring tube.

Having thus described my invention, what we claim and desire to secure by Letters Patent is—

In a puncture proof spring tire, a rim having a centrally disposed peripheral raised table, an outer casing seating on the rim at opposite sides of the table, a resilient inner lining composed of interwoven longitudinal and transverse metal bands, the transverse bands extending approximately at right angles to the longitudinal bands and having their ends free and projecting beyond the latter, said free ends of the transverse bands being arranged on the rim table in spaced and opposing relation with each other, spaced bent plates having depressed edge seats engaging over the outer of said longitudinal bands and provided with face portions between the seats for engaging with and clamping the free ends of the transverse bands onto the rim table, a bolt for each plate projecting upwardly through the rim table and between the spaced free ends of the transverse bands and having threaded engagement with its plate, and means for clamping the casing against the side walls of the rim table.

In testimony whereof we have hereunto set our hands in the presence of two subscribing witnesses.

WILLIAM McCALL.
MICHAEL O'SULLIVAN.
ELVIN C. McCALL.

Witnesses:
GEO. H. STRONG,
JOHN H. HERRING.